United States Patent [19]
Hoffart

[11] Patent Number: 6,010,199
[45] Date of Patent: Jan. 4, 2000

[54] SELF-CLEANING ENDLESS TRACK

[76] Inventor: Ronald J. Hoffart, 755 2nd Ave. NW., West Fargo, N. Dak. 58078

[21] Appl. No.: 09/002,310

[22] Filed: Jan. 2, 1998

[51] Int. Cl.[7] .................................................. B62D 55/088
[52] U.S. Cl. ........................... 305/113; 305/193; 305/201
[58] Field of Search ....................................... 305/111, 113, 305/114, 198, 201, 193, 194, 195, 196, 197

[56] References Cited

U.S. PATENT DOCUMENTS

| | | | |
|---|---|---|---|
| 1,924,161 | 8/1933 | Knox | 305/111 X |
| 2,455,307 | 11/1948 | Irvin | 305/201 X |
| 2,755,146 | 7/1956 | Galanot | 305/193 X |
| 3,355,224 | 11/1967 | Skanes et al. | 305/193 X |
| 3,497,271 | 2/1970 | Keller | 305/114 |
| 4,099,794 | 7/1978 | Hoffart | 305/113 |

*Primary Examiner*—Russell D. Stormer
*Attorney, Agent, or Firm*—Michael S. Neustel

[57] ABSTRACT

An self-cleaning endless track which reduces slippage between the tires of a skid-loader and the endless track. The inventive device includes a plurality of track pads interconnected, wherein each track pad comprises a pair of grouser members extending parallel between a pair of opposing side members, a pair of slots on opposing sides of the side members for pivotally receiving a link member, and a corresponding pair of gripping members attached to an upper surface of the pair of grouser members. The gripping members reduce slippage between the tires of the skid-loader and the endless track, thereby extending the useful life of the skid-loader.

19 Claims, 7 Drawing Sheets

SELF-CLEANING ENDLESS TRACK

BACKGROUND OF THE INVENTION

1. Field of the Invention

The present invention relates generally to endless tracks utilized on tractors such as skid-loaders, and more specifically it relates to a self-cleaning endless track which reduces the amount of slippage between the tires of the skid-loader and the inner portion of the track.

Endless tracks have been utilized for years about the tires of skid-loaders. A common problem of this type of endless track is slippage between the tires and track. Since the spacing between the treads on modern tires has narrowed, the problem of slippage has increased. Further, when the endless track collects debris and fluids, the smooth upper surface of the grouser members become extremely slippery. Hence, there is a need for a self-cleaning endless track which reduces slippage between the tires and the grouser members.

2. Description of the Prior Art

There are numerous endless track devices. For example, U.S. Pat. No. 4,099,794 to Hoffart; U.S. Pat. No. 3,497,271 to Keller; U.S. Pat. No. 2,680,421 to Baker; U.S. Pat. No. 1,931,522 to Barnes et al.; and U.S. Pat. No. 1,915,561 to Van Derveer are all illustrative of such prior art.

While these devices may be suitable for the particular purpose to which they address, they are not as suitable for reducing the slippage between the endless track and the tires of the skid-loader. The prior art does not disclose an endless track which provides increased traction for modern tires on skid-loaders.

In these respects, the endless track according to the present invention substantially departs, from the conventional concepts and designs of the prior art, and in so doing provides an apparatus primarily developed which reduces slippage between the tires of the skid-loader and the endless track.

SUMMARY OF THE INVENTION

A primary object of the present invention is to provide a endless track that will overcome the shortcomings of the prior art devices.

Another object is to provide a self-cleaning endless track that reduces the amount of slippage between the tires of the skid-loader and the endless track.

An additional object is to provide a endless track that extends the useful life of the tires by reducing slippage.

A further object is to provide a endless track that extends the useful life of the drive-train and engine of the skid-loader by providing a consistent flow of power to the endless track.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
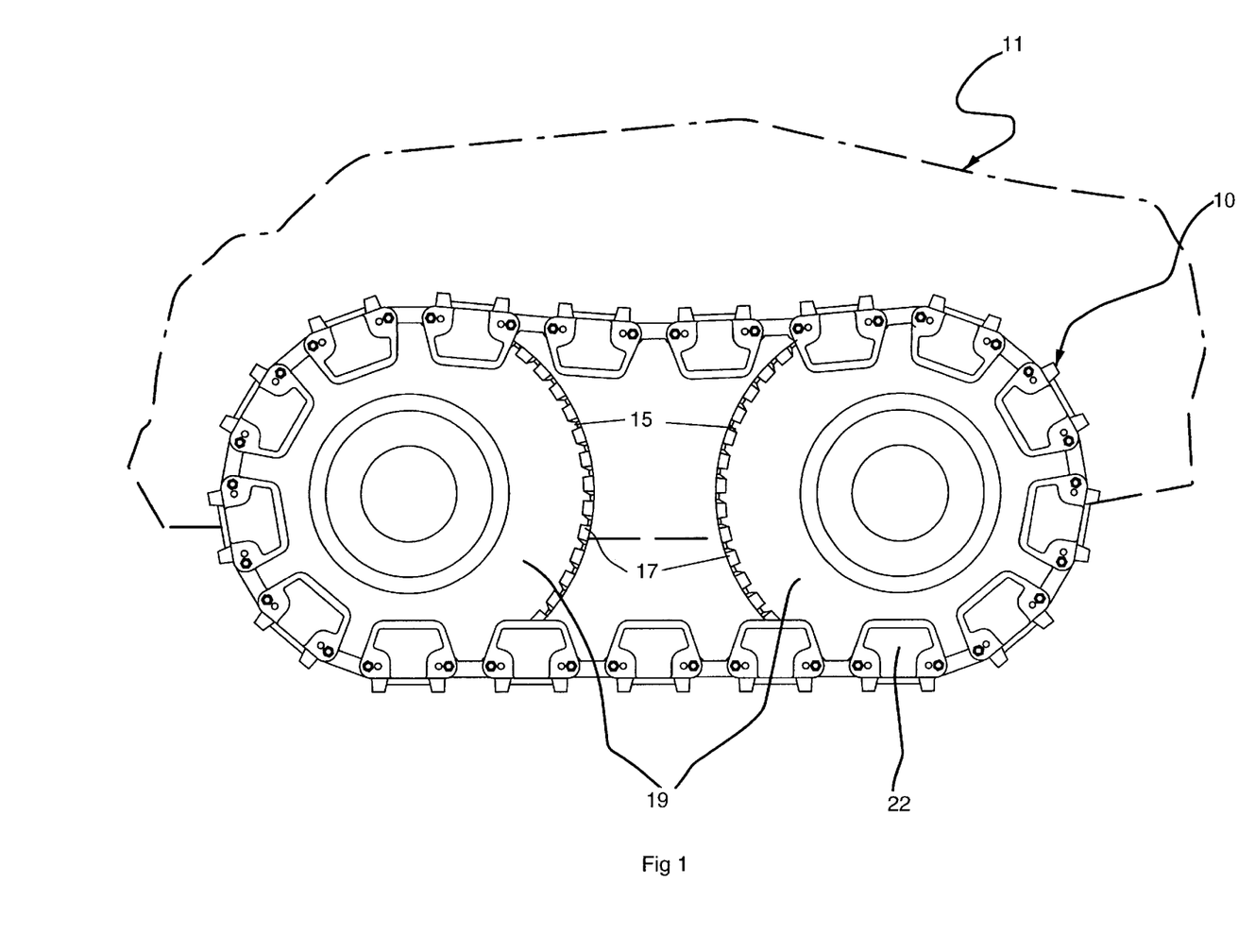
FIG. 1 is a side view of the present invention surrounding the wheels of a skid-loader.
Figure 2:
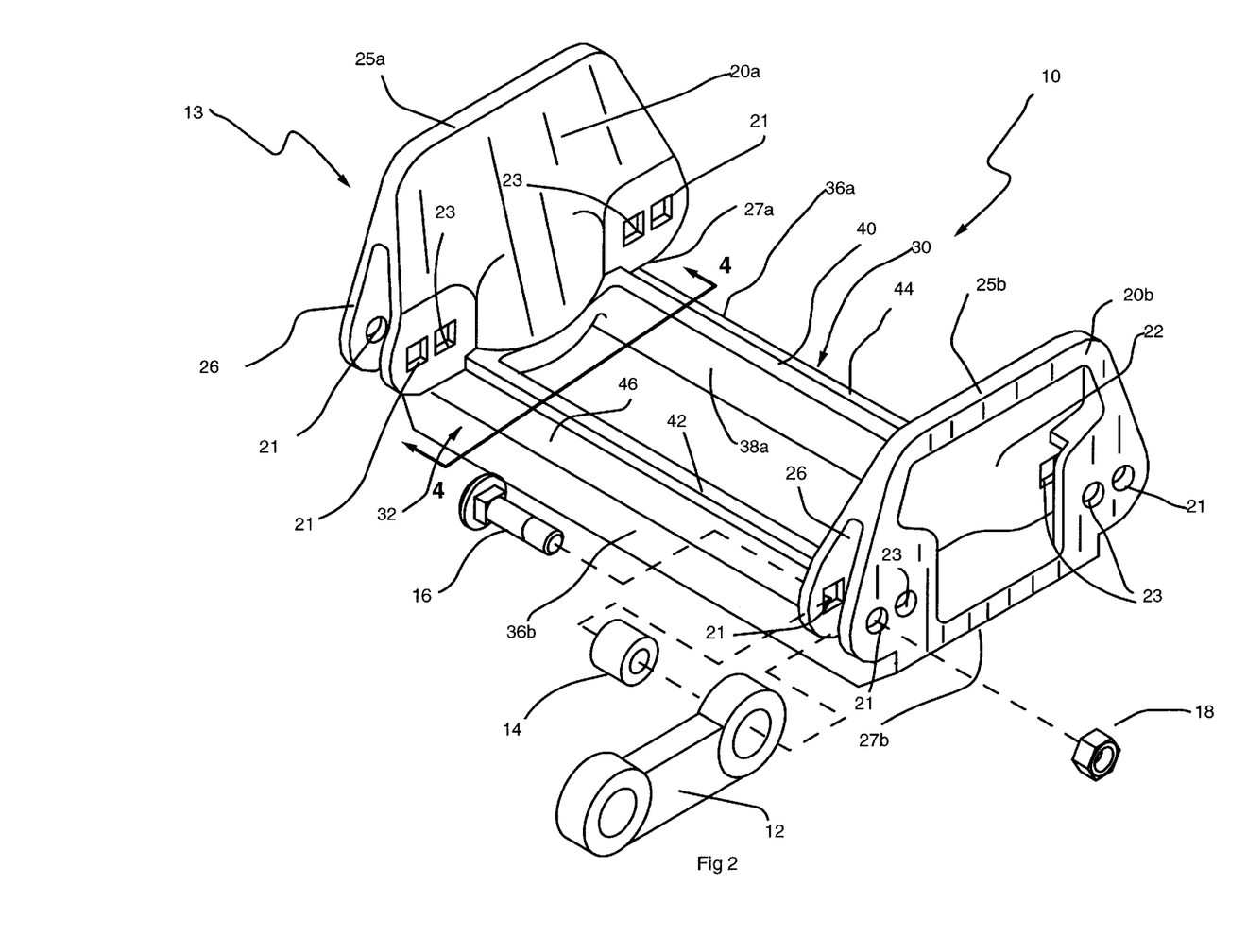
FIG. 2 is an exploded upper perspective view of the present invention.
Figure 3:
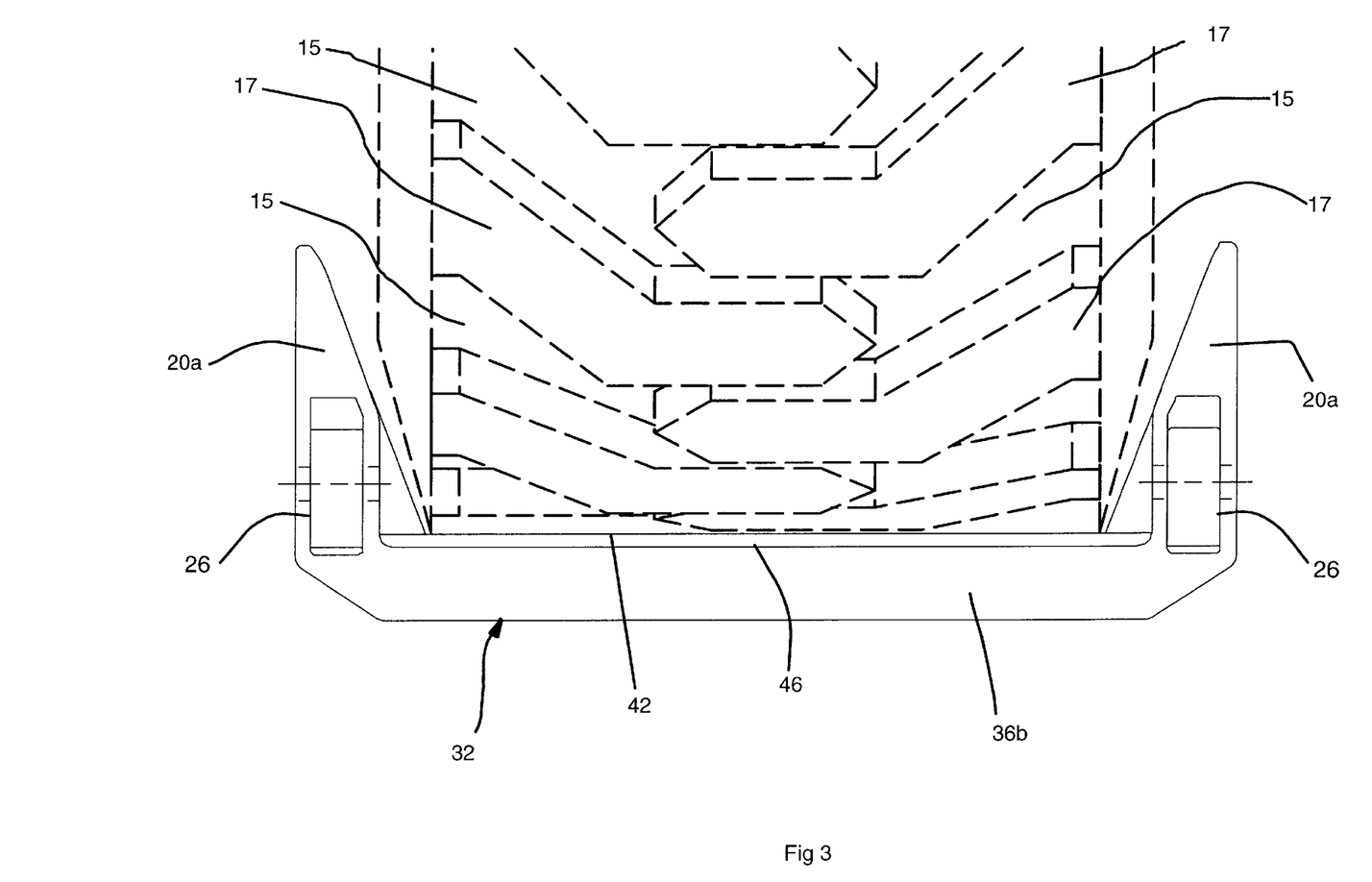
FIG. 3 is a front view of the present invention receiving a tire.

Turning now descriptively to the drawings, in which similar reference characters denote similar elements throughout the several view, FIGS. 1 through 7 illustrate a self-cleaning endless track 10, which comprises a plurality of track pads 13 interconnected to form an endless track as best shown in FIG. 1 of the drawings. Each track pad 13 preferably comprises two grouser members 30, 32 extending between a second end 27a–b of a pair of opposing side members 20a–b, a cavity 22 within each of the side members 20a–b, and a pair of slots 26 on opposing sides of the side members 20a–b for pivotally receiving a link member 12. The side members 20a–b have a first end 25a–b opposite of the second end 27a–b as shown in FIGS. 2 and 3 of the drawings. The track pads 13 are constructed from conventional materials such as metal or plastic.

Figure 4:
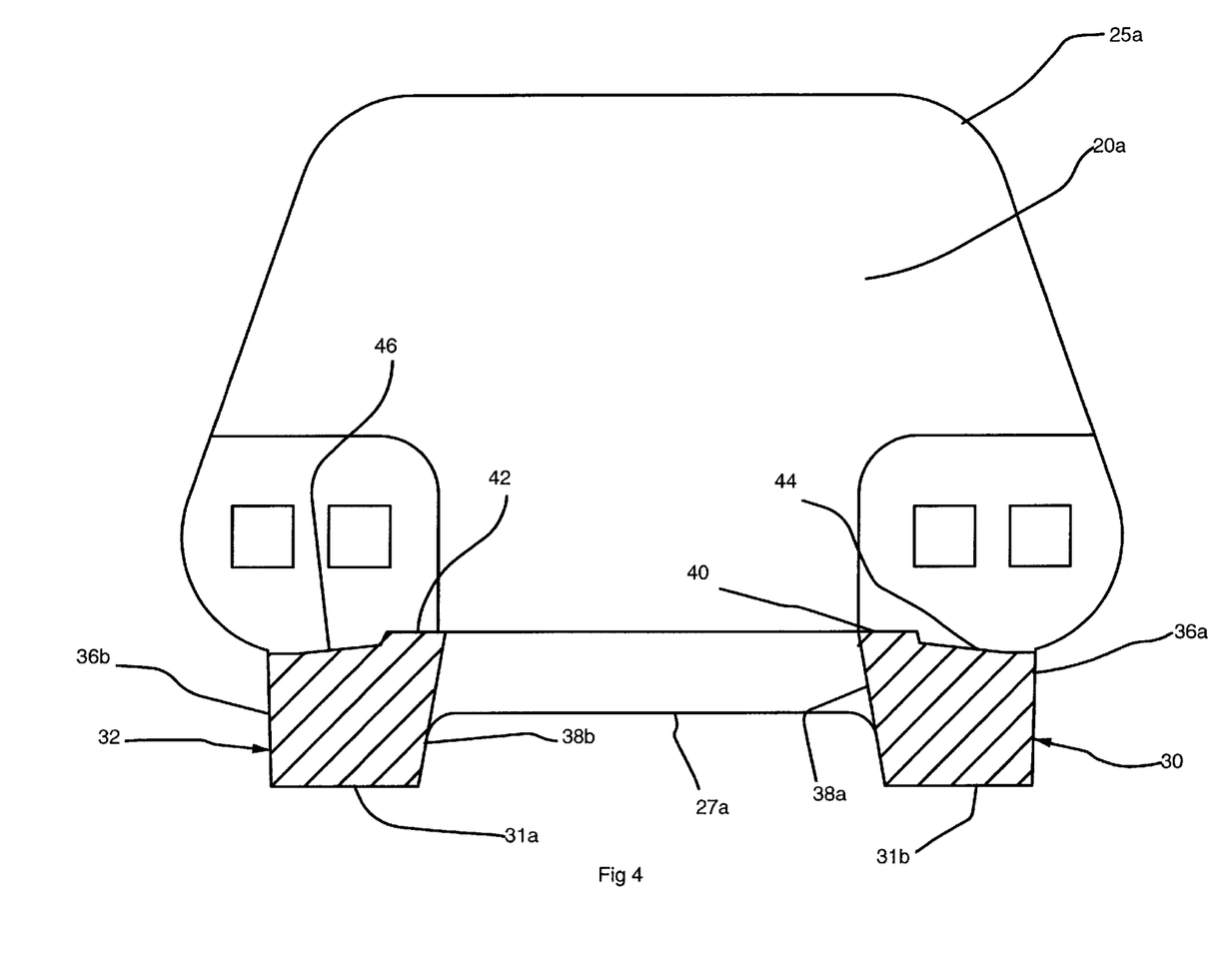
FIG. 4 is a cross sectional view along line 4—4 from FIG. 2.

As shown in FIG. 2 of the drawings, the side members 20a–b are in opposition to one another. Each of the side members 20a–b has a cavity 22 throughout exposed at opposing ends by the pair of slots 26 as best shown in FIG. 2 of the drawings. Each slot 26 receives a link member 12 pivotally connected within by a fastener 16a, bushing 14 and nut 18 combination as shown in FIG. 2 of the drawings. A pair of outer apertures 21 and inner apertures 23 project through each of the side members as shown in FIGS. 2 through 4 of the drawings. The user may adjust the length of the track by positioning the link member 12 in the desired aperture 21, 23.

As shown in FIGS. 2 and 4 of the drawings, preferably two grouser members 30, 32 are attached to a second end 27a–b of the opposing side members 20a–b. The grouser members 30, 32 are preferably parallel to one another and distally spaced apart for receiving the tire 19 of the skid-loader 11.

As shown in FIG. 4 of the drawings, the first grouser member 30 includes an inner edge 38a, a first surface 44, an outer edge 36a, a wear surface 31a and a first gripping member 40. The second grouser member 32 includes an inner edge 38b, a second surface 46, an outer edge 36b, a wear surface 31b and a second gripping member 42. The wear surfaces 31a–b engage the ground surface and provide increased traction for the skid-loader 11 compared to conventional tires. The first and second gripping members 40, 42 extend along a substantial portion of the first and second surfaces 44, 46 respectively as shown in FIG. 2 of the drawings for gripping the tire 19 of the skid-loader 11. Preferably, the first and second gripping members 40, 42 are adjacent to the inner edges 38a–b as best shown in FIG. 4. The gripping members 40, 42 may be attached to the grouser members 30, 32 or they may be molded into the grouser members 30, 32 as one skilled in the art would know.

The inner edges 38*a–b* are upwardly angled toward one another to form an inverted V-shaped cavity with an open upper end as shown in FIG. 4 of the drawings. This inverted V-shaped cavity allows accumulated debris between the inner edges 38*a–b* to easily be freed when the track pad 13 is disengaged from the ground surface. The tires 19 extend into the open upper end of the inverted V-shaped cavity to force the accumulated debris outwardly from within, thereby increasing traction of the track pad 13 when in repeated engagement with the ground surface.

Figure 5:
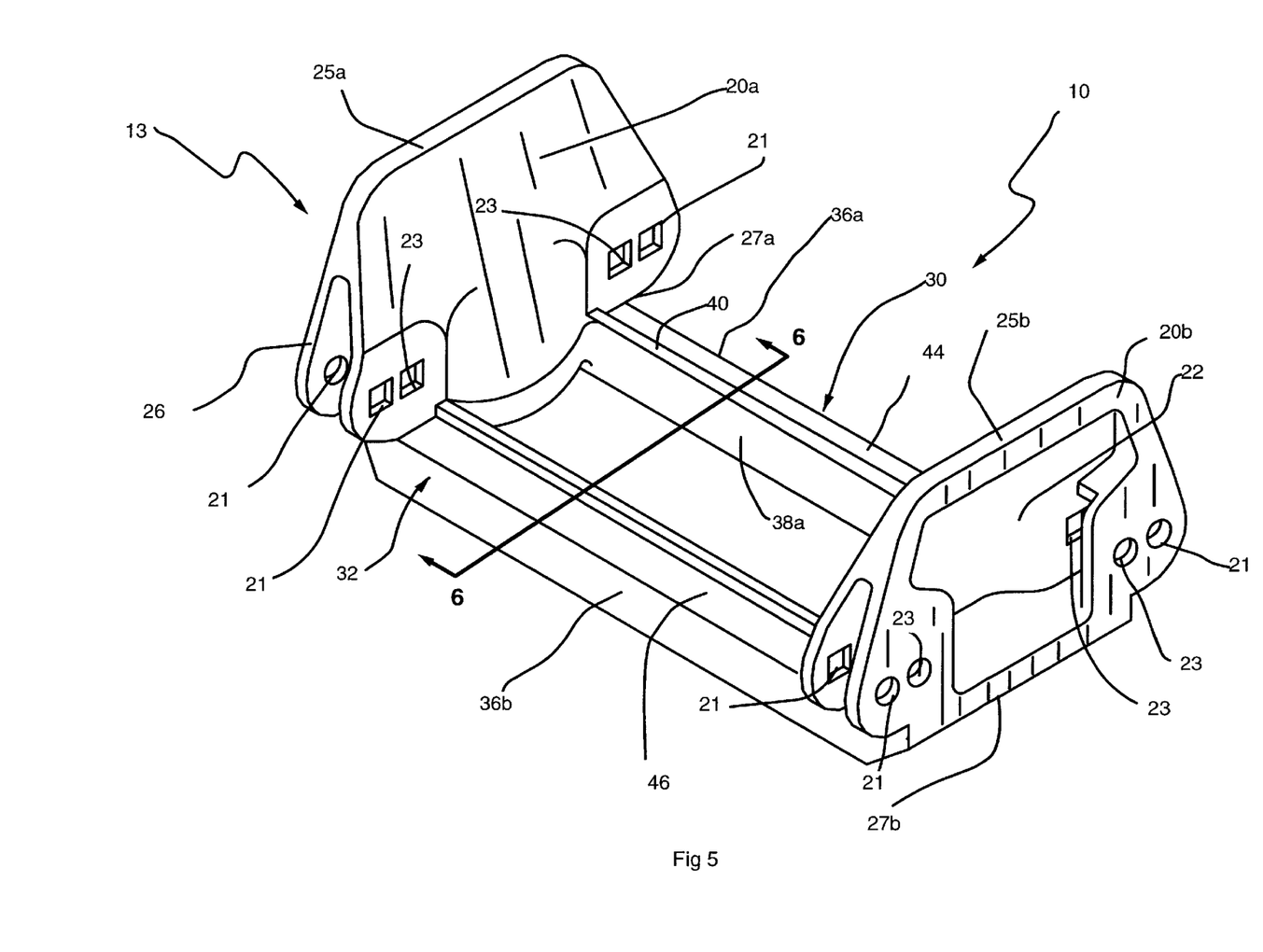
FIG. 5 is an exploded upper perspective view of an alternative embodiment of the present invention.
Figure 6:
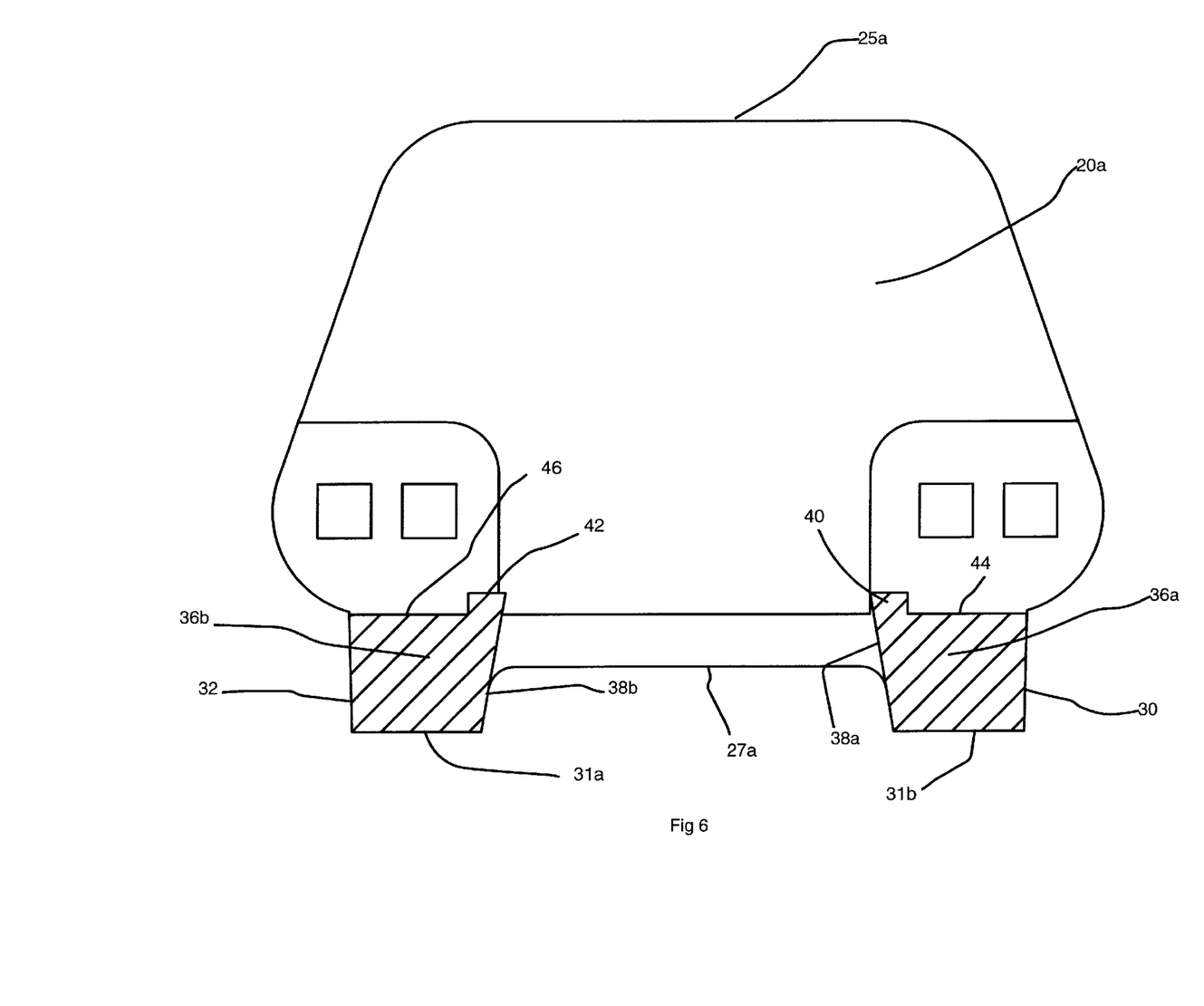
FIG. 6 is a cross sectional view along line 6—6 from FIG. 5.
Figure 7:
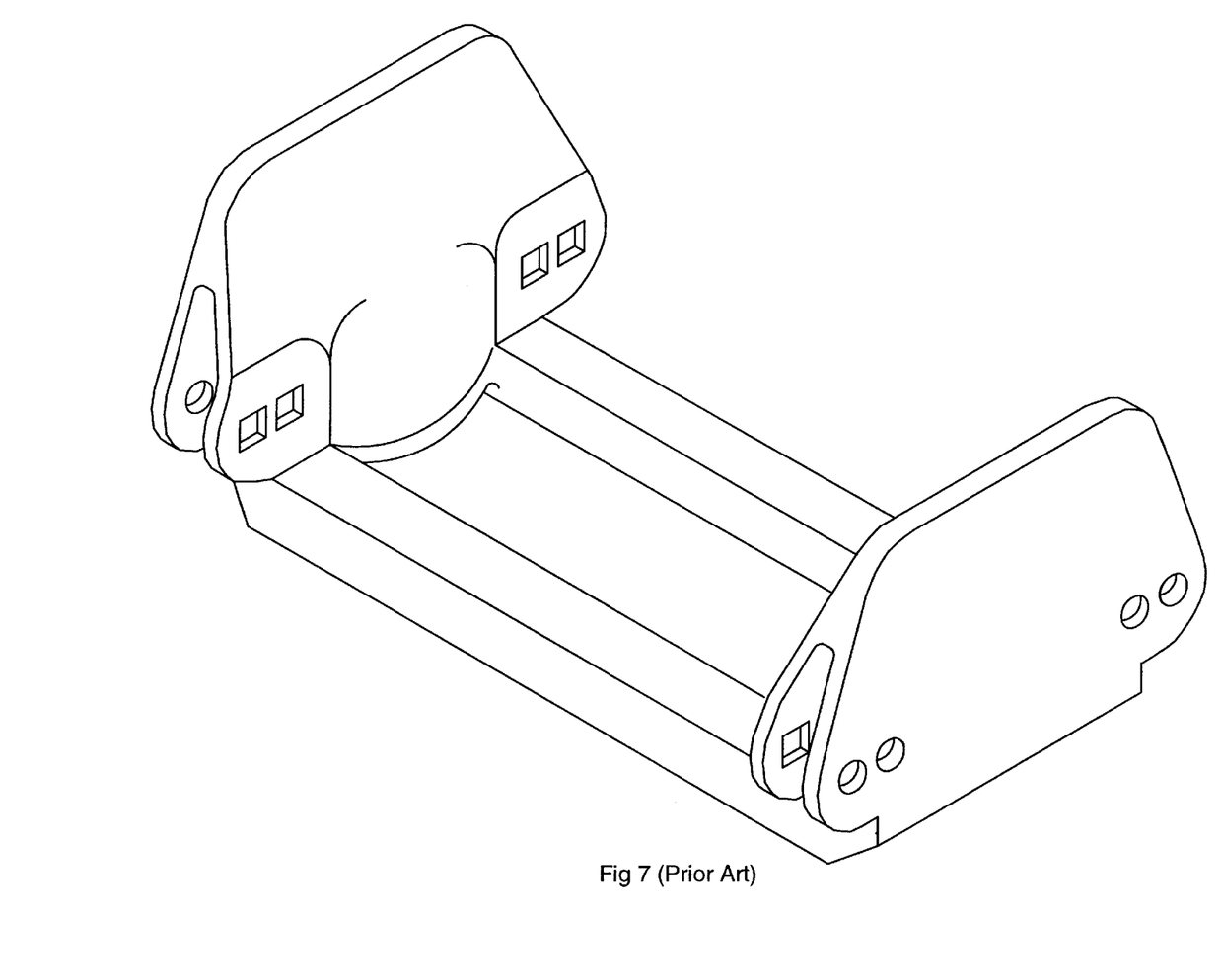
FIG. 7 is an upper perspective view of the prior art which discloses a flat upper surface of the grouser members.

As further shown in FIG. 4 of the drawings, the first and second surfaces 44, 46 preferably slope downwardly from the gripping members 40, 42 towards the outer edges 36*a–b*. The sloped surfaces 44, 46 facilitate cleaning of debris from the inner portion of the endless tract 10 thereby increasing traction between the tires 19 and the gripping members 40, 42 and the grouser members 30, 32. In an alternative embodiment as shown in FIGS. 5 and 6, the first and second surfaces 44, 46 are substantially parallel to one another.

In use, the endless track 10 is adjustably fitted about a pair of tires 19 of the skid-loader 11 as shown in FIG. 1 of the drawings. The user operates the skid-loader 11 as usual causing the endless track 10 to rotate endlessly about the tires 19. A lower portion of the endless track 10 is in engagement with the ground surface and an upper portion is exposed. The wear surface, 31*a–b* engage the ground surface as shown in FIG. 1 of the drawings. The recessed areas 15 of the tires 19 between the raised tread 17 surrounds a gripping member 40, 42. The raised tread 17 engages the gripping members 40, 42 and a portion of the first and second surfaces 44, 46 of each track pad 13 for moving the tires 19 within the inner portion of the endless track 10. Accumulated debris within the inner portion of the endless track 10 are dispersed away from the endless track 10 by the sloped first and second surfaces 44, 46. As the track pad 13 is moved to the upper portion of the endless track 10, the tire 19 extends between the grouser members 30, 32 to eject any accumulated debris between the inner edges 38*a–b*. The tire 19 moves toward the next track pad 13 and the above process is repeated until the user changes course.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A track pad for an endless track utilized on a skid-loader, comprising:

a pair of side members each having a front end, a rear end, an upper end, a lower end, and an outer surface;

a pair of spaced grouser members attached between said lower ends of said side members defining an opening therebetween, each of said grouser members having an upper surface, a lower surface, an inner surface and an outer surface;

wherein said upper surface of each of said grouser members slants downwardly from said inner surface to said outer surface of said rouser members for facilitating cleaning of said track pad; and at least one gripping member attached to said upper surface of at least one of said grouser members.

2. The track pad of claim 1, wherein said at least one gripping member is engagable between raised tread of a tire of said skid-loader.

3. The track pad of claim 2, wherein said at least one gripping member extends along a substantial portion of said upper surface.

4. The track pad of claim 3, wherein said at least one gripping member is substantially narrower than said upper surface.

5. The track pad of claim 4, wherein said inner surfaces of said pair of grouser members slant downwardly diverging from one another.

6. The track pad of claim 5, wherein said at least one gripping member is adjacent said inner surface.

7. The track pad of claim 6, wherein said at least one gripping member comprises a pair of gripping members attached to said upper surfaces of said grouser members adjacent said inner surfaces.

8. The track pad of claim 7, wherein said pair of gripping members have a substantially rectangular cross-sectional area.

9. The track pad of claim 8, wherein said pair of gripping members are parallel to a longitudinal axis of said grouser members.

10. The track pad of claim 9, wherein said upper surface is narrower than said lower surface of said pair of grouser members.

11. A track pad for an endless track utilized on a skid-loader, comprising:

a pair of side members each having a front end, a rear end, an upper end, a lower end, and an outer surface;

a pair of spaced grouser members attached between said lower ends of said side members defining an opening therebetween, each of said grouser members having an upper surface, a lower surface, an inner surface and an outer surface;

wherein said upper surface of each of said grouser members slants downwardly from said inner surface to said outer surface of said grouser members for facilitating cleaning of said track pad; and wherein each of said grouser members includes a lip extending from said upper surface for engaging raised tread of a tire of said skid-loader.

12. The track pad of claim 11, wherein said lip extends along a substantial portion of said upper surface.

13. The track pad of claim 12, wherein said lip is substantially narrower than said upper surface.

14. The track pad of claim 13, wherein said inner surfaces of said pair of grouser members slant downwardly diverging from one another.

15. The track pad of claim 14, wherein said lip is adjacent said inner surface.

16. The track pad of claim 15, wherein each of said upper surfaces slant downwardly away from said gripping member for facilitating cleaning of said track pad.

17. The track pad of claim 16, wherein said lip has a substantially rectangular cross-sectional area.

18. The track pad of claim 17, wherein said lip is parallel to a longitudinal axis of said grouser member.

19. The track pad of claim 18, wherein said upper surface is narrower than said lower surface of said pair of grouser members.

* * * * *

Disclaimer 6,010,199—Ronald J. Hoffart, West Fargo, N. Dak. SELF-CLEANING ENDLESS TRACK. Patent dated January 4, 2000. Disclaimer filed October 9, 2003, by the assignee, Ronald J. Hoffart.

Hereby enters this disclaimer to claims 1-19, of said patent.

*(Official Gazette, March 2, 2004)*